(12) United States Patent
Baca

(10) Patent No.: US 11,547,618 B2
(45) Date of Patent: Jan. 10, 2023

(54) SUPPORT DEVICES INCLUDING COLLAPSIBLE CASTERS

(71) Applicant: Toyota Motor North America, Inc., Plano, TX (US)

(72) Inventor: Michael Baca, Kalamazoo, MI (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 322 days.

(21) Appl. No.: 16/890,467

(22) Filed: Jun. 2, 2020

(65) Prior Publication Data

US 2021/0369517 A1 Dec. 2, 2021

(51) Int. Cl.

| B60B 33/00 | (2006.01) |
|---|---|
| A61G 5/06 | (2006.01) |
| A61G 5/10 | (2006.01) |
| B60B 33/04 | (2006.01) |
| A61G 5/12 | (2006.01) |
| A61G 5/04 | (2013.01) |

(52) U.S. Cl.
CPC ........... *A61G 5/063* (2013.01); *A61G 5/1078* (2016.11); *B60B 33/0057* (2013.01); *B60B 33/045* (2013.01); *A61G 5/045* (2013.01); *A61G 5/128* (2016.11)

(58) Field of Classification Search
CPC ............. B60B 33/045; B60B 33/0042; B60B 33/0002; B60B 33/0028; B60B 33/0057; B60B 33/06; B60B 33/063; B60B 33/066; B60B 2200/45; B60B 2900/212; B62B 2301/22; B62B 2301/20; B60G 11/22; B60G 11/225; B60G 2204/41; B60G 2300/084; B60G 7/04; A61G 2005/1078; A61G 5/063; A61G 5/1078; A61G 5/128; A61G 5/045; A45C 5/04; Y10T 16/196; Y10T 16/212

See application file for complete search history.

(56) References Cited

U.S. PATENT DOCUMENTS

| 1,745,992 A * | 2/1930 | Herold .................. B60B 33/045 |
| | | 267/257 |
| 2,472,686 A * | 6/1949 | Snyder .................. B60B 33/045 |
| | | 267/275 |
| 4,000,912 A * | 1/1977 | Donald ................. B60B 33/045 |
| | | 267/71 |

(Continued)

FOREIGN PATENT DOCUMENTS

| CN | 101305951 | 11/2008 |
| WO | WO-03024379 A1 * | 3/2003 ............... A61G 5/06 |

OTHER PUBLICATIONS

Discover ideas about Wheelchairs (https://br.pinterest.com/pin/364580532316604163/?amp_client_id=CLIENT_ID(_)&mweb_unauth_id=&from_amp_pin_page=true), Accessed Jan. 2020.

*Primary Examiner* — Chuck Y Mah
(74) *Attorney, Agent, or Firm* — Dinsmore & Shohl LLP

(57) ABSTRACT

A support device includes a base member, a caster assembly coupled to the base member including a caster pivotally coupled to the base member, at least two planar members positioned above the caster and pivotally coupled to one another by at least two opposing hinges, and a shaft positioned between the at least two opposing hinges and extending through the at least two planar members.

13 Claims, 2 Drawing Sheets

(56) References Cited

U.S. PATENT DOCUMENTS

| | | | | |
|---|---|---|---|---|
| 4,485,521 | A | * | 12/1984 | Welsch ................ B60B 33/045 16/44 |
| 4,559,669 | A | * | 12/1985 | Bonzer ................ B60B 33/045 16/44 |
| 6,149,169 | A | * | 11/2000 | Chelgren ................ B60G 3/02 280/647 |
| 6,460,641 | B1 | | 10/2002 | Kral |
| 6,532,623 | B1 | * | 3/2003 | Watanabe ........... B60B 33/0049 267/257 |
| 6,543,798 | B2 | | 4/2003 | Schaffner et al. |
| 6,908,087 | B2 | * | 6/2005 | Wintersgill ......... B60B 33/0049 280/37 |
| 8,607,414 | B1 | * | 12/2013 | Kinsela ................ B60B 33/045 16/35 D |
| 9,370,455 | B2 | | 6/2016 | Molner |
| 10,118,440 | B1 | * | 11/2018 | Schenk ............... B60B 33/0078 |
| 10,308,068 | B2 | * | 6/2019 | Sharp .................... B60B 33/045 |
| 10,434,019 | B2 | | 10/2019 | Bekoscke et al. |
| 2006/0117524 | A1 | * | 6/2006 | Yan ....................... B60B 33/045 16/44 |
| 2007/0145711 | A1 | | 6/2007 | Mulhern et al. |
| 2015/0174957 | A1 | * | 6/2015 | Brazier .............. B60B 33/0068 16/45 |
| 2015/0258851 | A1 | * | 9/2015 | Hart .................... A61G 5/1078 280/86.1 |
| 2021/0229491 | A1 | * | 7/2021 | McKay .............. B60B 33/0076 |

* cited by examiner

SUPPORT DEVICES INCLUDING COLLAPSIBLE CASTERS

TECHNICAL FIELD

The present specification generally relates to support devices including collapsible casters and methods for operating the same.

BACKGROUND

Support devices, such as wheelchairs, assistive robots, mechanized walkers, and the like, are conventionally used to assist users in moving from one location to another. For example, wheelchairs can move a user between locations, and assistive robots and mechanized walkers can provide support to a user moving between locations. In some instances, assistive robots and mechanized walkers may be used to carry objects between locations. Conventional support devices can include casters that move along a surface, such as a floor or the ground. As the support devices move around an environment, the casters may contact obstacles, such as curbs or the like. Contact with the obstacles may introduce stress on the casters, which can lead to failure of the caster and/or require that the caster be replaced.

SUMMARY

Casters according to the present disclosure are selectively collapsible. By selectively collapsing, for example upon impact with an obstacle, the force of the impact may be absorbed. By absorbing the force of the impact, the stress transmitted to the caster from the impact may be reduced, thereby increasing the usable life of the caster.

In one embodiment, a support device includes a base member, a caster assembly coupled to the base member including a caster pivotally coupled to the base member, at least two planar members positioned above the caster and pivotally coupled to one another by at least two opposing hinges, and a shaft positioned between the at least two opposing hinges and extending through the at least two planar members.

In another embodiment, a support device including a base member structurally configured to support a user, a caster assembly coupled to the base member including a caster pivotally coupled to the base member, at least two hinged members positioned above the caster and pivotally coupled to one another by at least two opposing hinges, and a biasing member extending through the at least two hinged members, where the at least two hinged members are positionable between an extended position and a neutral position, where the at least two hinged members are positioned closer to one another in the neutral position as compared to the extended position.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally directed to support devices that include selectively collapsible caster assemblies. Caster assemblies according to embodiments described herein generally include a caster that is pivotally coupled to a base member of a support device. The caster assemblies include hinged members that are pivotally coupled to one another through opposing hinges, and a biasing member and/or a shaft that is positioned between opposing hinges. Upon impact with an obstacle, the caster is movable with respect to the base member of the support device, for example through rotation about the opposing hinges. Moreover, in embodiments that include the biasing member, force of the impact with the obstacle can be absorbed by the biasing member. By allowing the caster to move with respect to the base member (e.g., by allowing the caster assembly to "collapse"), and by absorbing force of the impact via the biasing member, stress applied to the caster assembly can be reduced as compared to caster assemblies that are rigidly coupled to a support device. Moreover, by positioning the shaft and/or biasing member between the opposing hinges, the hinge assembly defines a comparatively small footprint, such that maneuverability of the support device can be maintained. These and other embodiments of support devices including caster assemblies will now be described with reference to the appended figures.

Figure 1:
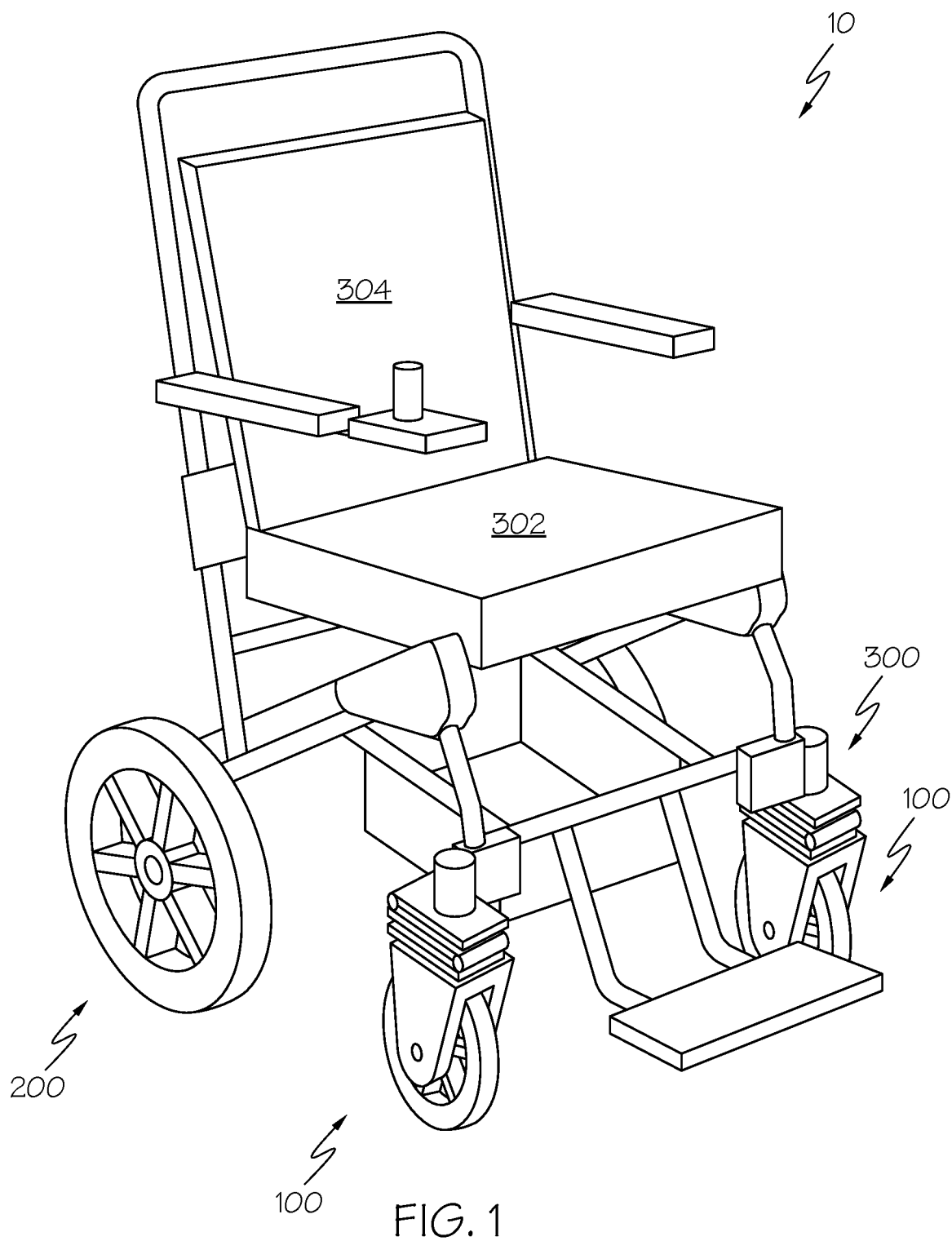
FIG. 1 schematically depicts a perspective view of a support device, according to one or more embodiments shown and described herein.

Referring initially to FIG. 1 a perspective view of a support device 10 is schematically depicted. In embodiments, the support device 10 includes a base member 300. In some embodiments, the support device 10 is a wheelchair that supports a person, and the base member 300 may include a seat 302 and a backrest 304 or the like. In some embodiments, the support device 10 may be an assistive robot, a mechanized walker, or the like, and the base member 300 may be a base of the robot or the mechanized walker. In some embodiments, the base member 300 may be structurally configured to carry items, for example groceries or other items that a user wishes to move from one location to another.

In embodiments, the support device 10 includes one or more wheels 200 coupled to the base member 300. The one or more wheels 200 can be rotatably coupled to the base member 300, or may be rotatably coupled to a leg that is coupled to the base member 300, and may provide mobility to the support device 10 such that the support device 10 may move along a surface, such as the ground or a floor. In some embodiments, the one or more wheels 200 are powered, such as by a motor or the like, for example and without limitation, a direct current (DC) motor, an alternating current (AC) motor, a hydraulic motor, a pneumatic motor, or the like. In some embodiments, the one or more wheels 200 may be manually powered, for example by a user pushing the support device 10 and/or a user seated within the support device 10 pushing the wheels 200.

In embodiments, the support device 10 further includes one or more caster assemblies 100 coupled to the base member 300. For example, in the embodiment depicted in FIG. 1, the support device 10 includes two caster assemblies 100 coupled to a front end of the base member 300, and the one or more wheels 200 are coupled to a rear end of the base member 300. While in the embodiment depicted in FIG. 1 the one or more wheels 200 are coupled to the rear end of the base member 300 and the caster assemblies 100 are coupled to the front end of the base member 300, it should be understood that this is merely an example. For example, in some embodiments, the one or more wheels 200 and the caster assemblies 100 may be coupled to the base member 300 at any suitable location. Further, while in the embodiment depicted in FIG. 1, the support device 10 includes two caster assemblies 100, it should be understood that the support device 10 may include any suitable number of caster assemblies 100 coupled to the base member 300.

Figure 2:
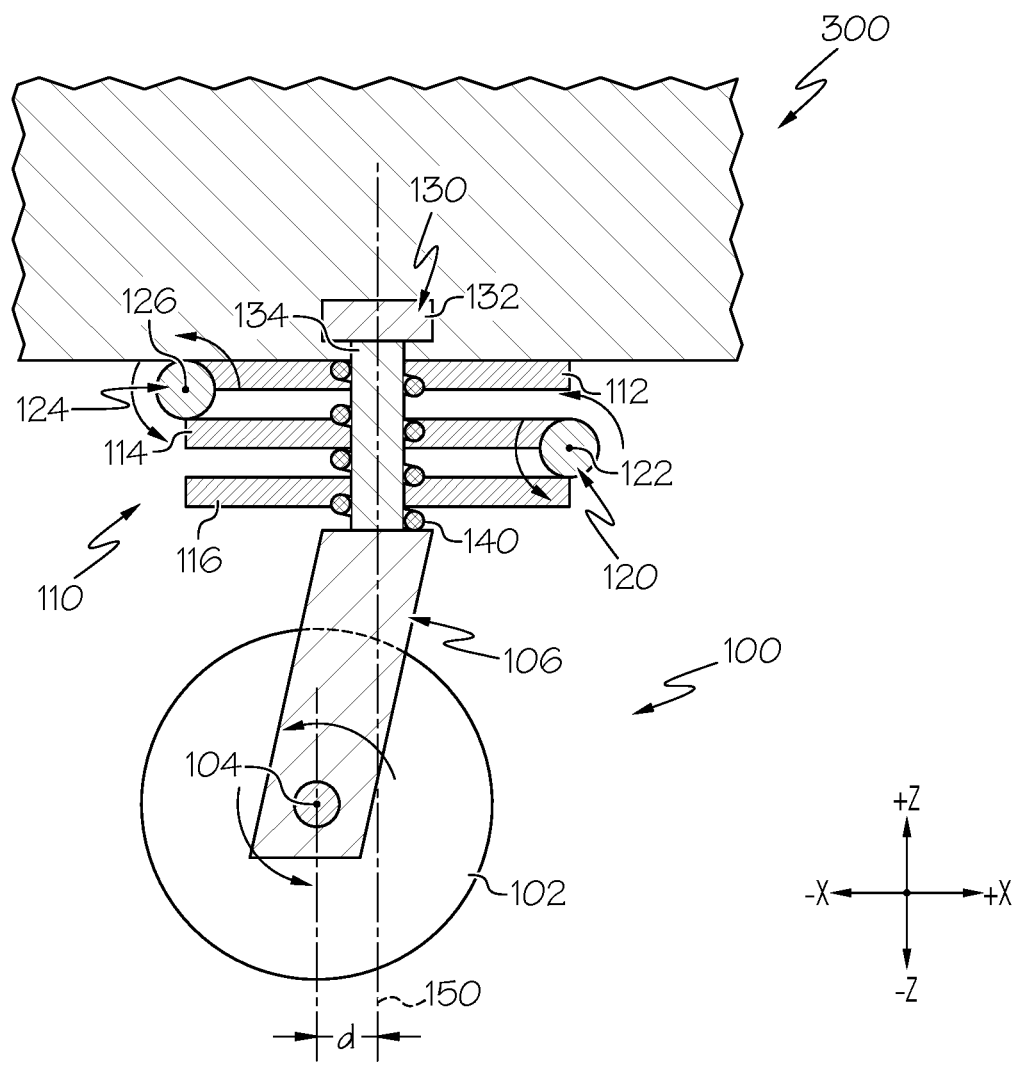
FIG. 2 schematically depicts a section view of a caster assembly of the support device of FIG. 1, according to one or more embodiments shown and described herein.

Referring to FIG. 2, a section view of one of the caster assemblies 100 is schematically depicted. While in the embodiment depicted in FIG. 2 a single caster assembly 100 is shown, it should be understood that each of the caster assemblies 100 of the support device 10 may include similar construction, or may include different constructions. In embodiments, the caster assembly 100 includes a caster 102 pivotally coupled to the base member 300. The caster 102 may include any suitable shape to support the support device 10 (FIG. 1) on a surface. For example, in some embodiments, the caster 102 may be a cylindrically-shaped wheel. In some embodiments, the caster 102 may be spherically-shaped.

The caster 102 generally defines a caster axis of rotation 104. In embodiments, the caster axis of rotation 104 is oriented transverse to a vertical direction (e.g., the +/−Z-direction depicted in FIG. 2). In embodiments, the caster 102 is rotatable about the caster axis of rotation 104, such that the caster 102 can "roll" along a surface.

In some embodiments, the caster assembly 100 includes a shaft 130. In some embodiments, the shaft 130 may include a flange 132 engaged with the base member 300, and a pin portion 134 extending downward from the flange 132. The shaft 130 generally couples the caster 102 to the base member 300. In the embodiment depicted in FIG. 2, the caster assembly 100 includes a bracket 106 that is coupled to the shaft 130 and the caster 102, such that the shaft 130 is coupled to the caster 102 through the bracket 106. The caster 102 is rotatable with respect to the bracket 106 about the caster axis of rotation 104, and the bracket 106 and the caster 102 are rotatable with respect to the base member 300 about the shaft 130. For example, in some embodiments, the shaft 130 generally extends in the vertical direction (e.g., in the +/−Z-direction as depicted) and defines a shaft axis of rotation 150 that extends in the vertical direction. In embodiments, the bracket 106 and the caster 102 are rotatable with respect to the base member 300 about the shaft axis of rotation 150. In some embodiments, the caster 102 and the bracket 106 rotate about the shaft 130, while the shaft 130 is stationary with respect to the base member 300, however, in some embodiments, the shaft 130 also rotates about the shaft axis of rotation 150 with respect to the base member 300. In embodiments, the caster axis of rotation 104 is oriented transverse to the shaft 130 and the shaft axis of rotation 152.

In some embodiments, the caster 102 is offset from the shaft 130, for example in directions that are transverse to the vertical direction. For example, in the embodiment depicted in FIG. 2, the caster axis of rotation 104 is offset from the shaft axis of rotation 150 by a distance d in the −X-direction as depicted. By offsetting the caster 102 from the shaft 130, the caster 102 may be induced to "trail" the shaft 130 when the support device 10 moves in directions transverse to the vertical direction (e.g., the +/−Z-direction as depicted). For example, as the support device 10 moves in the +X-direction, the caster 10 may trail the shaft 130 such that the caster axis of rotation 104 is spaced apart from the shaft axis of rotation 150 by the distance d evaluated in the −X-direction.

In embodiments, the caster assembly 100 includes at least two hinged members 110 that are positioned above the caster 102 and that are pivotally coupled to one another by at least two opposing hinges 120, 124. In some embodiments, the at least two hinged members 110 are planar members, e.g., plates. In the embodiment depicted in FIG. 2, the caster assembly 100 includes a first hinged member 112 that is coupled to the base member 300. The caster assembly 100, as depicted in FIG. 2, includes a second hinged member 114 that is pivotally coupled to the first hinged member 112 at a first hinge 124. A third hinged member 116 is pivotally coupled to the second hinged member 114 at a second hinge 120. In embodiments, the third hinged member 116 is coupled to the bracket 106, and is thereby coupled to the caster 102 through the bracket 106. Each of the first and second opposing hinges 124, 120 define a hinge axis of rotation that is oriented transverse to the shaft 130. For example, in the embodiment depicted in FIG. 2, the first hinge 124 defines a first hinge axis of rotation 126 that is oriented transverse to the shaft 130, and the second hinge 120 defines a second hinge axis of rotation 122 that is oriented transverse to the shaft 130.

In embodiments, the shaft 130 is positioned between the first and second opposing hinges 124, 120, for example, in the X-direction as depicted. The shaft 130 may also extend through the at least two hinged members 110. For example, one or more of the at least two hinged members 110 may include an aperture or the like through which the shaft 130 extends.

In some embodiments, the caster assembly 100 further includes a biasing member 140 that extends through the at least two hinged members 110. The biasing member 140, in some embodiments, extends around the shaft 130. More particularly, the biasing member 140 may extend around the pin portion 134 of the shaft 130, and in some embodiments, the biasing member 140 extends through the at least two hinged members 110 and is positioned between the first and second opposing hinges 124, 120. By positioning the shaft 130 and/or the biasing member 140 between the first and second opposing hinges 124, 120, a footprint of the caster assembly 100 may be minimized. For example, by positioning the shaft 130 and/or the biasing member 140 between the first and second opposing hinges 124, 120, the caster assembly 100 may be consolidated as evaluated in the X-direction as depicted. By minimizing the footprint of the caster assembly 100, maneuverability of the support device 10 can be improved, as compared to caster assemblies including a comparatively larger footprint with components that are spaced apart from one another.

The biasing member 140 is generally engaged with the caster 102, for example through the bracket 106, and is engaged with the base member 300. The biasing member 140 may include, for example, a compression spring, a tension spring, a torsion spring, or the like that biases the caster assembly 100 into a neutral position, as shown in FIG. 2. For example, in embodiments, the first hinge 124 allows the second hinged member 114 to rotate with respect to the first hinged member 112 about the first hinge axis of rotation 126. Likewise, the second hinge 120 allows the third hinged member 116 to rotate with respect to the second hinged member 114 about the second hinge axis of rotation 122. As noted above, the first hinged member 112 is coupled to the base member 300, and the third hinged member 116 is coupled to the caster 102 (through the bracket 106). Accordingly, as the third hinged member 116 rotates about the second hinge axis of rotation 122 (for example, in a counter-clockwise movement as depicted), the caster 102 also rotates about the second hinge axis of rotation 122, and moves in the +X-direction. Conversely, as the second hinge member 114 rotates about the first hinge axis of rotation 126 (for example, in a clockwise movement as depicted), the caster 102 also rotates about the first hinge axis of rotation 126, and moves in the −X-direction. In this way, the at least two hinged members 110 and the first and second opposing hinges 124, 120 allow freedom of movement of the caster 102 in directions that are transverse to the vertical direction, for example, in the +/−X-direction as depicted.

In embodiments, the caster 102 may be moved in the −X-direction as depicted, for example, through contact with an obstacle, such as a curb or the like. For example, as the support device 10 (FIG. 1) moves in the +X-direction, the caster 102 may contact an obstacle that imparts a force on the caster 102 in the −X-direction. This force may cause the second hinged member 114 and the caster 102 to rotate about the first hinge axis of rotation 126. The second hinged member 114 thereby moves away from the first hinged member 112 into an extended position. In some embodiments, the first hinged member 112 and the second hinged member 114 are oriented transverse to one another in the extend position. As the caster 102 and the second hinged member 114 rotate about the first hinge axis of rotation 126, the biasing member 140, which is engaged the caster 102 and the base member 300, may be at least partially compressed, thereby absorbing forces associated with impact between the caster 102 and the obstacle. After the contact with the obstacle, e.g., once force is no longer being imparted on the caster 102 from the obstacle, the biasing member 140 may bias the caster 102 (and the second hinged member 114) to return to the neutral position depicted in FIG. 2. For example, the biasing member 140 may cause the caster 102 and the second hinged member 114 to rotate about the first hinge axis of rotation 126 in the counter-clockwise direction as depicted, moving the second hinged member 114 closer to the first hinged member 112 as compared to the extended position.

Similarly, the caster 102 may be moved in the +X-direction as depicted, for example, through contact with an obstacle, such as a curb or the like. For example, as the support device 10 (FIG. 1) moves in the −X-direction, the caster 102 may contact an obstacle imparting a force on the caster 102 in the +X-direction. This force may cause the third hinged member 116 and the caster 102 to rotate about the second hinge axis of rotation 122. The third hinged member 116 thereby moves away from the second hinged member 114 into an extended position. In some embodiments, the third hinged member 116 and the second hinged member 114 are oriented transverse to one another in the extended position. As the caster 102 and the third hinged member 116 rotate about the second hinge axis of rotation 122, the biasing member 140, which is engaged the caster 102 and the base member 300, may be at least partially compressed, thereby absorbing forces associated with impact between the caster 102 and the obstacle. After the contact with the obstacle, e.g., once force is no longer being imparted on the caster 102 from the obstacle, the biasing member 140 may bias the caster 102 (and the third hinged member 116) to return to the neutral position depicted in FIG. 2. For example, the biasing member 140 may cause the caster 102 and the third hinged member 116 to rotate about the second hinge axis of rotation 122 in the clockwise direction as depicted, moving the third hinged member 116 closer to the second hinged member 114 as compared to the extended position.

It should now be understood that embodiments described herein are generally directed to support devices that include selectively collapsible caster assemblies. Caster assemblies according to embodiments described herein generally include a caster that is pivotally coupled to a base member of a support device. The caster assemblies include hinged members that are pivotally coupled to one another through opposing hinges, and a biasing member and/or a shaft that is positioned between opposing hinges. Upon impact with an obstacle, the caster is movable with respect to the base member of the support device, for example through rotation about the opposing hinges. Moreover, in embodiments that include the biasing member, force of the impact with the obstacle can be absorbed by the biasing member. By allowing the caster to move with respect to the base member (e.g., by allowing the caster assembly to "collapse"), and by absorbing force of the impact via the biasing member, stress applied to the caster assembly can be reduced as compared to caster assemblies that are rigidly coupled to a support device. Moreover, by positioning the shaft and/or biasing member between the opposing hinges, the hinge assembly defines a comparatively small footprint, such that maneuverability of the support device can be maintained.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A support device comprising:
   a base member;
   a caster assembly coupled to the base member comprising:
      a caster pivotally coupled to the base member;
      at least two planar members positioned above the caster and pivotally coupled to one another by at least two opposing hinges;
      a shaft positioned between the at least two opposing hinges and extending through the at least two planar members; and
      a biasing member positioned around the shaft and extending through the at least two planar members,
      wherein the two opposing hinges include a first hinge member and a second hinge member, each defining a hinge axis of rotation that is oriented transverse to the shaft, and wherein the second hinge member is rotatable about an axis of the first hinge member.

2. The support device of claim 1, wherein the caster defines a caster axis of rotation that is oriented transverse to the shaft.

3. The support device of claim 2, wherein the caster axis of rotation is offset from the shaft.

4. The support device of claim 1, wherein the biasing member is a compression spring.

5. The support device of claim 1, wherein the biasing member extends through the at least two planar members between the at least two opposing hinges.

6. The support device of claim 1, wherein the biasing member is engaged with the caster.

7. The support device of claim 1, wherein the at least two planar members are positionable between a neutral position and an extended position, wherein the at least two planar members are closer to one another in the neutral position as compared to the extended position.

8. A support device comprising:
- a base member structurally configured to support a user;
- a caster assembly coupled to the base member comprising:
  - a caster pivotally coupled to the base member;
  - at least two hinged members positioned above the caster and pivotally coupled to one another by at least two opposing hinges; and
- a biasing member extending through the at least two hinged members, wherein the at least two hinged members are positionable between an extended position and a neutral position, wherein the at least two hinged members are positioned closer to one another in the neutral position as compared to the extended position,
  - wherein the two opposing hinges include a first hinge member and a second hinge member, each defining a hinge axis of rotation that is oriented transverse to the shaft, and wherein the second hinge member is rotatable about an axis of the first hinge member.

9. The support device of claim 8, further comprising a shaft that is positioned between and couples the caster to the base member.

10. The support device of claim 9, wherein the caster defines a caster axis of rotation that is transverse to the shaft.

11. The support device of claim 10, wherein the caster axis of rotation is offset from the shaft.

12. The support device of claim 8, wherein the biasing member is a compression spring.

13. The support device of claim 8, wherein the at least two hinged members are oriented transverse to one another in the extended position.

* * * * *